United States Patent
Madsen

[11] Patent Number: 6,004,255
[45] Date of Patent: Dec. 21, 1999

[54] DECANTER CENTRIFUGE

[75] Inventor: Bent Madsen, Gentofte, Denmark

[73] Assignee: Alfa Laval Separation AB, Tumba, Sweden

[21] Appl. No.: 09/091,621

[22] PCT Filed: Dec. 10, 1996

[86] PCT No.: PCT/SE96/01622

§ 371 Date: Sep. 15, 1998

§ 102(e) Date: Sep. 15, 1998

[87] PCT Pub. No.: WO97/23295

PCT Pub. Date: Jul. 3, 1997

[30] Foreign Application Priority Data

Dec. 21, 1995 [SE] Sweden ................................ 9504577

[51] Int. Cl.[6] ..................................................... B04B 1/20
[52] U.S. Cl. ................................................................ 494/54
[58] Field of Search ..................... 494/50–55; 210/380.1, 210/380.3; 198/661, 662, 664, 676

[56] References Cited

U.S. PATENT DOCUMENTS

| | | |
|---|---|---|
| 2,862,658 | 12/1958 | Dahlgren . |
| 3,795,361 | 3/1974 | Lee . |
| 3,885,784 | 5/1975 | Sautton . |
| 4,617,010 | 10/1986 | Epper et al. .............................. 494/52 |
| 4,784,634 | 11/1988 | Schiele ..................................... 494/52 |
| 4,832,267 | 5/1989 | Meek ....................................... 198/664 |
| 5,037,373 | 8/1991 | Mozley ..................................... 494/55 |

FOREIGN PATENT DOCUMENTS

| | | |
|---|---|---|
| 0 258 012 | 3/1988 | European Pat. Off. . |
| 548955 | 4/1932 | Germany .................................. 494/52 |
| 33 01 099 | 12/1987 | Germany . |
| 41 20 565 | 5/1993 | Germany . |

Primary Examiner—Charles E. Cooley
Attorney, Agent, or Firm—Fish & Richardson P.C.

[57] ABSTRACT

In a decanter centrifuge, which comprises an outer drum (1) and an inner drum (5) concentric therewith, the two drums being rotatable at different speeds around a common center axis, the inner drum (5) carries several blades (6, 7) arranged to convey axially in the outer drum (1) sludge having settled on the inside of the drum. The blades (6, 7) are placed in parallel blade rows, each of which extends in a certain pitch along a first helical line (9, 10) around at least part of the center-axis. Each one of the blades extends along a second helical line (29c), which has a pitch opposite the pitch of the first helical line (9, 10). The distance between the rows of blades is substantially larger than the distance between two adjacent blades in one and the same row. Possibly, the inner drum may be provided with only a single row of blades.

15 Claims, 3 Drawing Sheets

DECANTER CENTRIFUGE

FIELD OF THE INVENTION

The present invention relates to a decanter centrifuge for freeing a liquid from particles suspended therein and having a density larger than that of the liquid and for subjecting sludge containing such particles separated from the liquid to compression in a centrifugal field, so that the sludge is freed from liquid as effectively as possible. Decanter centrifuges of this kind are used for example in connection with cleaning of sewage water from particles, the sludge thus formed by the particles in the decanter centrifuge being dewatered in the same centrifugal field as used for the said cleaning.

BACKGROUND OF THE INVENTION

A conventional decanter centrifuge for the above defined purpose usually comprises a rotatable drum and a sludge conveyor arranged therein. The sludge conveyor is rotatable at a speed differing from that of the drum and is adapted to convey the formed sludge axially towards a number of outlet openings in the drum. The sludge conveyor may have one or more conveying members extending helically and continuously several turns around the rotational axis of the drum.

It has proved difficult by means of a conventional decanter centrifuge of this kind to compress the sludge formed at the surrounding wall of the outer drum as effectively as would be desired and, simultaneously, to accomplish an axial transportation thereof in the drum. Thus, owing to the axial transportation of the sludge, an agitation thereof occurs, so that it is remixed with the liquid continuously flowing through the drum in a direct contact with and radially inside of the sludge. Hereby, the desired departure of liquid from the sludge is not obtained and the sludge, therefore, when leaving the decanter centrifuge has a too low dry substance content. The above discussed problem can be resolved to some extent by reduction of the rotational speed difference between the drum and the sludge conveyor and by reduction of the amount of suspension, e.g. sewage water, that is supplied to the decanter centrifuge per unit of time. However, this means that the decanter centrifuge gets a strongly reduced capacity. Furthermore, it is required in connection with increased dryness of the sludge an increased force for the axial transportation of the sludge within the drum, i.e. the momentum to which the sludge conveyor has to be subjected and which it has to transfer will be larger. These circumstances put limits to how this method of resolving the problem can be used in practice. In DE-33 01 099 C2 it has been proposed that the sludge conveyor in addition to its sludge conveying member should be provided with plates arranged to accomplish cutting surfaces in the separated and compressed sludge for facilitating that the sludge is freed from liquid. As far as known this proposal has not been used in practice to any substantial degree, if any. Besides, it is not believed that this would constitute any solution to the problems discussed above.

In U.S. Pat. No. 2,862,658 it has been proposed that separated sludge should be constantly subjected to stirring or agitation during its axial transportation in a decanter centrifuge to facilitate for a certain relatively light liquid component to leave the sludge. Such a constant agitation of the separated sludge would directly counteract, however, the above said desideratum of accomplishing a sludge as dry as possible, e.g. in connection with cleaning of sewage water.

In a presentation "Improved Sludge Dewatering with a new Decanter Centrfiuge" made by H. Reinach & W. Stahl at a "Filter Conference" in Karlsruhe, Germany, in the year 1989, it has been suggested that separated sludge would be effectively dewatered while conveyed in the conical part of a decanter centrifuge, i.e. radially inside the level of the separated liquid in the decanter centrifuge, if the sludge conveyor were provided with axial rows of inclined separate plates or blades instead of a helically extending conveying member. It is thus suggested that the blades should give the sludge the form of a ridge, which gradually and intermittently is displaced axially from one of its sides by the separate blades, across the longitudinal direction of the ridge, and that liquid would be given a possibility to drain off from the sludge not only through the front side slope of the ridge but also through the rear side slope of it during the periods of time when successive portions of the last mentioned slope is free from contact with the blades. Such a technique could probably not be used, giving the desired result, in the part of the decanter centrifuge wherein the sludge is situated in liquid, i.e. radially outside the cylindrical liquid surface formed in the decanter centrifuge.

SUMMARY OF THE INVENTION

The object of the present invention is to provide a decanter centrifuge, in which separated sludge may form a relatively thick sludge layer that, while being axially conveyed in the decanter centrifuge in the liquid filled part thereof, may be compressed effectively by means of centrifugal force, so that it becomes as liquid free as possible without this requiring too large forces to be used for the axial transportation of the sludge and without the decanter centrifuge getting too small a capacity.

This object can be obtained according to the invention by means of a decanter centrifuge comprising an outer drum, which has a central axis and forms a separation chamber surrounding the center axis, said separation chamber having an inlet for receiving said liquid that contains particles, an outlet for discharging separated liquid from the separation chamber at a predetermined radial level therein and an outlet for sludge; an inner drum which is arranged within said outer drum; means for rotation of said drums at different speeds around said center axis; and blades which are carried by the inner drum and formed for transportation—in a predetermined axial direction—of sludge that is constituted mainly by separated solid particles and that is situated in the separation chamber radially outside said predetermined radial level. Characteristic for the decanter centrifuge according to the invention is that said blades are placed in parallel blade rows, which are arranged at a distance from each other, seen in the circumferential direction of the inner drum, and each of which extends in a certain pitch along a first helical line around at least part of said center axis; that each of the blades extends from a leading front edge to a trailing rear edge of the blade—with reference to the moving direction of the inner drum relative to the outer drum during operation of the decanter centrifuge—substantially along part of a second helical line, which extends around the center axis in a pitch opposite the pitch of the first helical line; and that the distance in the circumferential direction of the drums, seen in a plane substantially perpendicular to said center axis, between the rear edge of a first blade, which during operation of the decanter centrifuge has displaced a portion of sludge axially relative to the outer drum, and said front edge of a second blade, that is arranged to displace this sludge portion further axially in the same direction, is substantially larger than the distance between two adjacent blades in the same row, seen along the first helical line.

In a decanter centrifuge of this kind there occurs a gradual intermittent transportation of sludge portions axially in the outer drum. The particles in each sludge portion, that is influenced by a blade, are subjected to a brief agitation after which, during a resting period, liquid having been enclosed in the sludge portion gets an opportunity to separate from the particles and the particles get an opportunity to settle again on the inside of the outer drum. In this way the sludge will become more and more freed from liquid the closer it comes to its outlet. Since only a small part of the sludge in the decanter centrifuge is influenced by the blades each moment of time, the power requirement for the sludge transportation becomes only a small part of the power requirement coming up if all the sludge in the decanter centrifuge would be transported simultaneously.

Following from the fact that the blades are arranged such that the two said helical lines have counter-directed pitches the blades in each row may be placed relatively close to each other without risk of relatively dry sludge getting stuck between adjacent blades and being entrained in the rotation of the inner drum. This is because the effective through flow area for sludge, that is to move through an interspace between two adjacent blades, is smallest where the sludge enters the interspace, when moving in the circumferential direction of the drums, and increases when the flow direction of the sludge is changed as a consequence of the actuation of the blades thereon.

The arrangement of the blades on the inner drum as suggested by the invention combines advantageous sludge transportation ability with advantageous prerequisites for freeing the sludge from liquid without an unnecessarily large power requirement for the sludge transportation.

Within the scope of the invention the inner drum may have any suitable design. Preferably, however, it has a substantially solid, i.e. imperforate, surrounding wall supporting the blades. Preferably, the surrounding wall has a circular cross section so that sludge, which between the blades reaches possibly all the way in to the surrounding wall, is not unnecessarily entrained in the rotation of the inner drum. Furthermore, the drum is preferably free of members which, during operation, may influence sludge that is present between the blade rows in the outer drum.

In a preferred embodiment of the invention each blade has a radially inner part that is situated closest to the inner drum and extends along an inner helical line around said center axis, and a radially outer part that is situated closest to the outer drum and extends along an outer helical line around the same center axis, said inner helical line having a larger pitch than said outer helical line. Furthermore, the side surface of each blade, facing in the direction of transportation of the particles, is preferably concave, so that the blade gets a function similar to that of a plough. Hereby, it is possible during operation gradually to lift portions of sludge situated closest to the surrounding wall of the outer drum and being relatively dry and heavy, and to apply sludge of this kind on top of sludge that has not yet had time to become as dry and heavy. This contributes to a good compression of the sludge under transportation.

If desired, the blades in each blade row may have different widths, i.e. different extension along its respective said second helical line. For instance, the blades may have a decreasing such width the closer they are situated to the sludge outlet. However, preferably the blades in each blade row have substantially the same width.

It has been presumed above that the inner drum supports two or more spaced blade rows. However, the invention is applicable even if the inner drum supports only one single row of blades, which extends by a certain pitch along a helical line, i.e. the above mentioned first helical line, around at least part of said center axis. In this case it is necessary that two adjacent blades in the blade row—a front blade and a rear blade seen in said predetermined axial direction for the transportation of sludge—are placed such that the rear edge of the rear blade is situated axially in front of the front edge of the front blade.

A blade row need not necessarily extend continuously along one and the same helical line along the whole axial extension of the inner drum. The inner drum may for instance have several relatively short blade rows, which extend along different helical lines and are placed in any desired way within the scope of the principle defined above for the invention.

It is further possible, and often advantageous, to combine one or more rows of blades according to the invention with one or more conventional sludge conveyor screws on the inner drum. Thus, the inner drum may preferably support a conventional conveyor screw on its end portion situated closest to the sludge outlet of the outer drum, particularly if the part of the outer drum situated closest to this outlet is conical and extends radially inside a free liquid surface in the outer drum.

It is further suitable that the inner drum, even on its end portion situated closest to the separated liquid outlet of the outer drum, has a conventional conveyor screw instead of blades. Thereby, the part of the outer drum interior situated closest to this outlet may more easily be kept free of separated sludge, making the separated liquid leaving the decanter centrifuge as free as possible from solid particles.

BRIEF DESCRIPTION OF THE DRAWINGS

The invention will be described more closely in the following with reference to the accompanying drawing.

In the drawing

DETAILED DESCRIPTION

Figure 1:
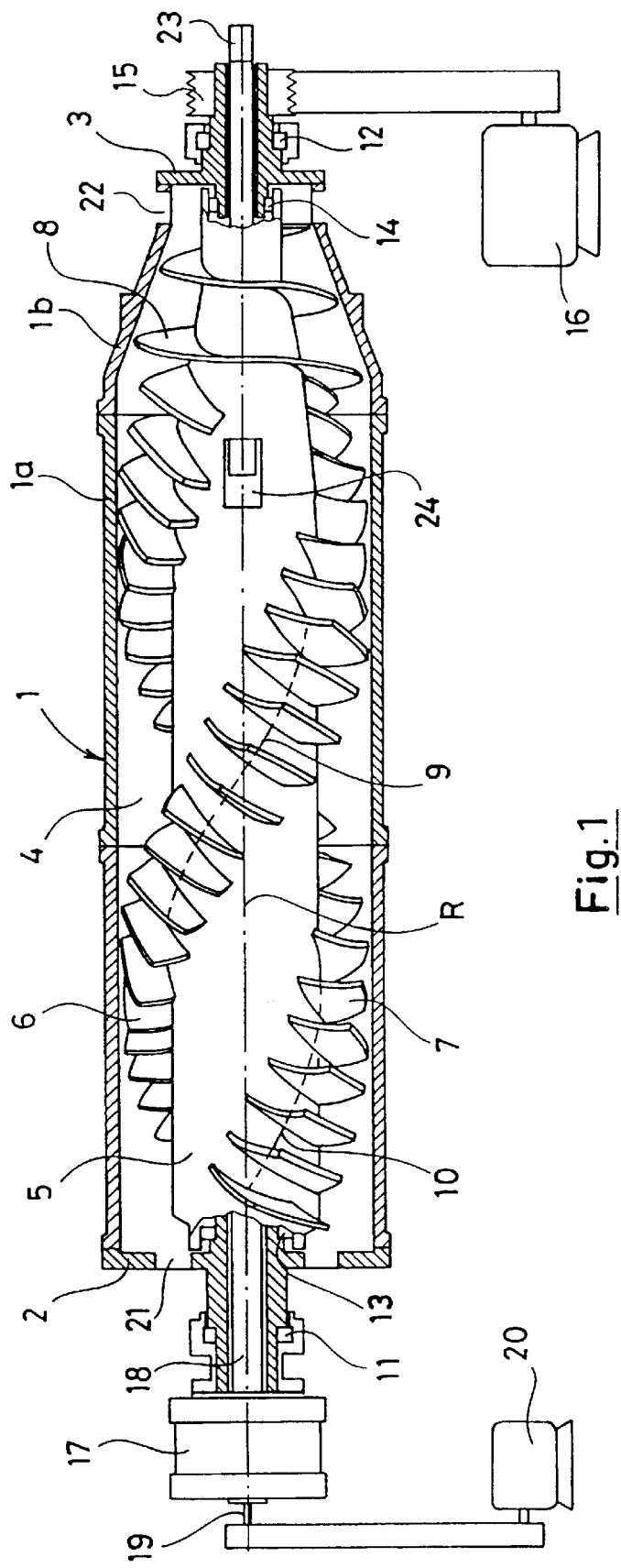
FIG. 1 shows, partly in section, a decanter centrifuge designed according to a first embodiment of the invention.

The decanter centrifuge in FIG. 1 comprises an outer drum 1, which has a cylindrical part 1a and a frusto conical part 1b connected therewith and has at its one end an end wall 2 and at its other end an end wall 3. The drum 1 forms and surrounds a separation chamber 4.

Within the outer drum 1 there is arranged an inner drum 5 also substantially cylindrical. Along the largest part of its axial extension the inner drum 5 supports on its outer side several separate blades 6 and 7 arranged in a certain way, whereas it supports on a smaller part situated in the conical part 1b of the outer drum 1 a helically extending conveyor screw 8.

The blades 6 and 7 are arranged in two rows, the blades 6 forming one row extending along a helical line 9 and the blades 7 forming the other row extending along a helical line 10 parallel therewith. The helical lines 9 and 10 which in FIG. 1 are shown by dotted lines extend helically on the outside of the inner drum 5 around its center axis. This center axis coincides with the center axis of the outer drum. The two center axes are designated R in FIG. 1.

The center axes R also constitute a common rotational axis around which the drums 1 and 5 are rotatable. The outer drum 1 is supported rotatably at its ends by bearings 11, 12, whereas the inner drum 5 at its ends is rotatable relative to the outer drum 1 by means of bearings 13, 14. The bearings 11, 12 are supported by a frame which is not shown, whereas the bearings 13, 14 are supported by the outer drum 1.

The outer drum 1 supports at its one end a belt pulley 15, which for the rotation of itself and the drum 1 is drivably connected with a motor 16. At its other end the drum 1 supports a planetary gear box 17. Whereas the surrounding housing of the planetary gear box 17, which has an internal gear rim (not shown), is firmly connected with the outer drum 1, planetary wheels (not shown) within the planetary gear box are connected through a shaft 18 with the inner drum 5. A sun wheel (not shown) in the planetary gear box is connected with a short shaft 19 which by means of a small motor 20 can be brought to rotate by a desired rotational speed in a desired rotation direction or be kept stationary, if this would be desired.

One end wall 2 of the drum 1 has several openings 21 evenly distributed around the rotational axis R and situated at a predetermined distance therefrom. At the opposite end of the drum 1 the conical part 1b thereof has several openings 22 also evenly distributed around the rotational axis R but situated at a common smaller distance from the rotational axis R than the openings 21.

Figure 2:
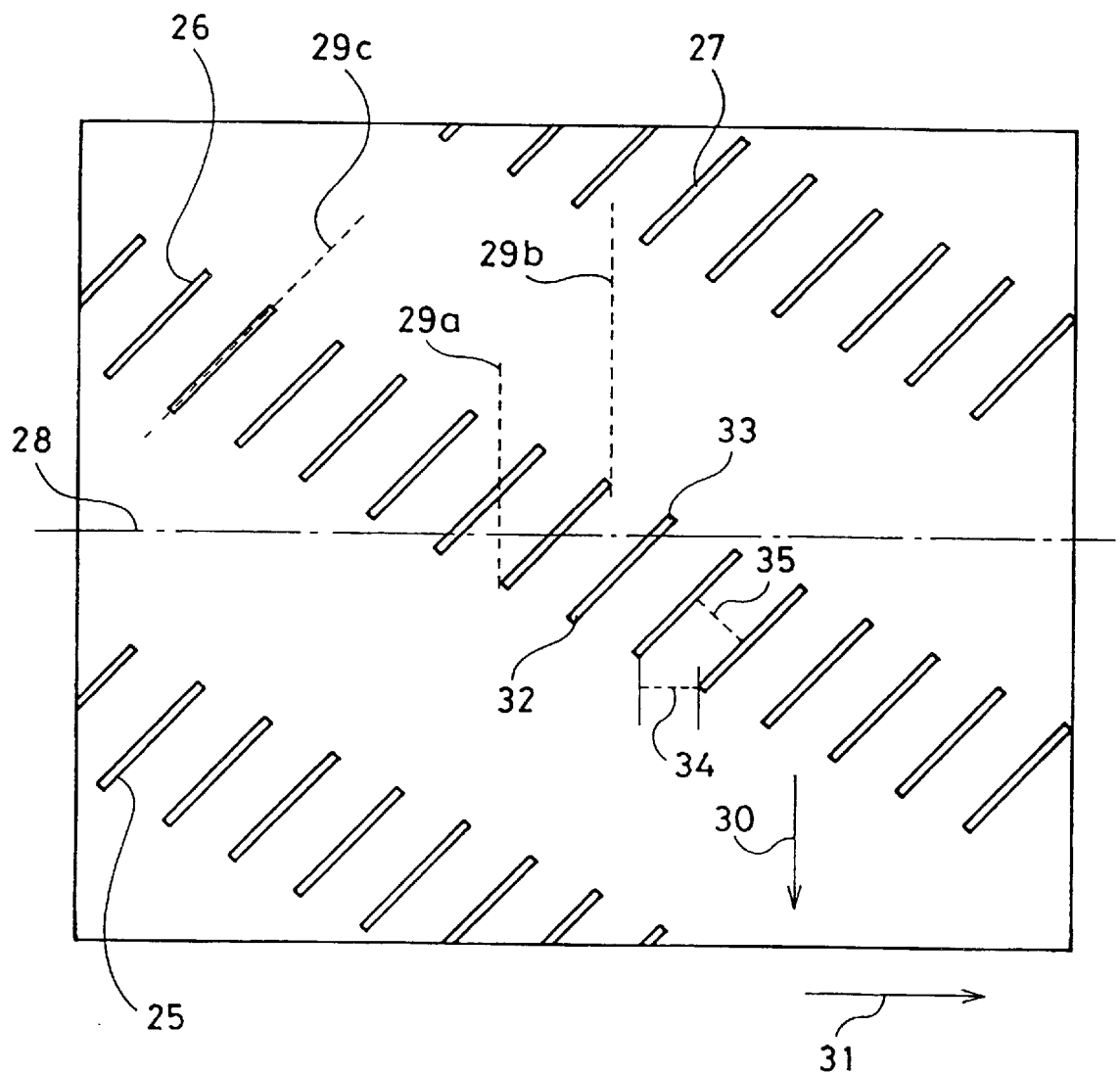
FIG. 2 illustrates schematically the arrangement of a number of blades on the surrounding wall of the inner drum in a decanter centrifuge of substantially the kind shown in FIG. 1.

A stationary pipe 23 extends through a hole in the belt pulley 15 and further in through the end wall 3 of the outer drum and into the inner drum 5, where it opens in a receiving chamber 24. Via locally situated holes through the surrounding wall of the inner drum 5 the receiving chamber 24 communicates with the separation chamber 4 in the outer drum 1. FIG. 2 shows, developed in a plane, a part of a surrounding wall of an inner drum similar to the inner drum 5 in FIG. 1 but provided with three rows of blades 25, 26 and 27 (instead of two rows of blades 6,7 in accordance with FIG. 1). A dash-dot line 28 indicates the extension of the rotational axis of the drum, corresponding to the rotational axis R in FIG. 1. Dotted lines 29a and 29b represent two different planes, each of which is perpendicular to the line or rotational axis 28, and a dotted line 29c illustrates a part of a helical line along which each of the blades 25–27 extends.

A first arrow 30 indicates the rotational direction of the drum, i.e. the direction of movement of the blades 25–27, in relation to the line 28, and a second arrow 31 indicates the direction towards the sludge outlet openings of an imagined outer drum, corresponding to the openings 22 in FIG. 1.

The operation of the decanter centrifuge shown in FIG. 1 will be described in the following. Reference will then also be made to FIG. 2 and it is disregarded that the drum in FIG. 2 has three rows of blades whereas the drum in FIG. 1 has only two such rows.

By means of the motor 16 the outer drum 1 is brought in rotation around the rotational axis R. Thereby also the inner drum 5 is brought in rotation—by action of the planetary gear 17—in the same direction as but at a somewhat different, preferably lower, speed than the drum 1. By means of the motor 20 a desired rotational speed of the inner drum 5 can be set. Control means (not shown) may be arranged for automatic control of the speed of the motor 20 depending upon some suitable sensed parameter, e.g. the dry substance content of sludge leaving the decanter centrifuge through the sludge outlets 22 or the torque to which the inner drum 5 is subjected.

When the drums 1 and 5 rotate, a mixture of liquid and solid particles suspended therein and having a density larger than that of the liquid is supplied through the inlet pipe 23.

Via the receiving chamber 24 the mixture enters the separation chamber 4 about in the area where the cylindrical part 1a of the drum 1 is connected with the conial part 1b of the drum. The mixture is distributed in the separation chamber 4 around the inner drum 5 and flows towards the openings 21 in the end wall 2 of the drum 1.

The edge portions of the openings 21, situated farthest from the rotational axis R, form outlet members, i.e. overflow outlets, for liquid leaving the drum through the openings 21. These edge portions are situated at a predetermined distance from the rotational axis R and accomplish that the liquid mixture in the separation chamber 4 forms a substantially cylindrical free liquid surface at a predetermined radial level in the separation chamber. Since the supplied mixture is entrained in the rotation of the drum 1 and, thus, is subjected to centrifugal forces, there is formed by the mixture a sludge layer, consisting mainly of particles, closest to the surrounding wall of the drum 1 and a layer of mainly liquid situated radially inside of the sludge layer. While flowing towards the outlet openings 21 the liquid is gradually freed from particles, which are thus collected in said sludge layer. The sludge layer settling against the surrounding wall of the drum 1 rotates at substantially the same speed as this.

The blades 6,7 of the inner drum are formed such that they extend radially out into said sludge layer. They are also placed such that upon their movement relative to the drum 1 and, thus, also relative to the sludge layer accomplish a gradual transportation of the sludge layer axially in a direction towards the openings 22 of the drum 1. These openings constitute the outlet of the drum for separated solid particles. In the conical part 1b of the drum 1 the sludge layer is transported axially up to the openings 22 by the continuously extending conveyor screw 8.

The function of the blades 6,7 is to be described below with reference to FIG. 2.

Each blade 25–27 has a leading front edge 32 and a trailing rear edge 33 with reference to the direction of movement 30 of the blade in relation to the above discussed sludge layer. Upon rotation of the inner drum each blade will displace a small amount or portion of sludge a small distance axially, corresponding to the distance between the lines 29a and 29b, in the direction indicated by the arrow 31. The sludge portion will first be contacted and be entrained by the leading front edge 32 of the blade and thereafter slide relative to the one side surface of the blade, which faces in the direction 31, to the subsequent rear edge 33 of the blade. As can be understood by the extension of the line 29b a sludge portion, which in the way just described has been moved axially a small distance by a blade 26, will then be left untouched in the outer drum 1 during a certain period of time before it is contacted by the leading front edge of a blade 27. After this the sludge portion will be moved by this blade 27 further a distance axially in the direction 31.

By its movement through the sludge layer each blade will cause, apart from axial displacements of successive sludge portions, local agitation of particles in the sludge layer. After such a local agitation of the particles in a sludge portion has occurred the particles are given an opportunity—before another agitation occurrs—to be freed from the liquid which they enclose and which is present in their vicinity. The sludge in this way, on its way towards the outlet openings 22 (FIG. 1), is subjected to intermittent agitation with intermediate periods of undisturbed centrifugal separation.

A dotted line 34 illustrates the purely axial extension of the opening that is axcessible to a sludge portion which is to move into the interspace between adjacent blades in the same blade row, and a dotted line 35 shows the distance between the same blades seen along the helical line formed by the blade row itself. As can be seen, the distance 35 is larger than the distance 34, which means that the risk is small that a sludge portion entering an interspace between two blades will be keyed firmly between the blades.

For improvement of the effect of the blades these are preferably formed such that they get the same function as a plough, when this is transported through a layer of soil. In other words, each blade is formed such that it can lift and turn substantially upside down the sludge portions it successively meets and moves axially on its way through the sludge layer. Hereby, the risk is minimized that liquid is maintained in the sludge layer as a consequence of bridge building of the separate solid particles. Since in this way parts of the driest and thereby heaviest sludge are piled upon less dry parts of the sludge, it is also achieved that the less dry parts of the sludge will be more rapidly compressed and give away liquid enclosed therein. For this purpose a blade is preferably given a form such that its side surface facing in the direction of transportation of the sludge layer is concave, as can be seen from FIG. 1. Further, as also can be seen from FIG. 1, each blade has a radially inner part, that is situated closest to the inner drum and extends along an inner helical line around said center axis, and a radially outer part that is situated closest to the outer drum and extends along an outer helical line around the same center axis, said inner helical line having a larger pitch than the outer helical line.

Figure 3:
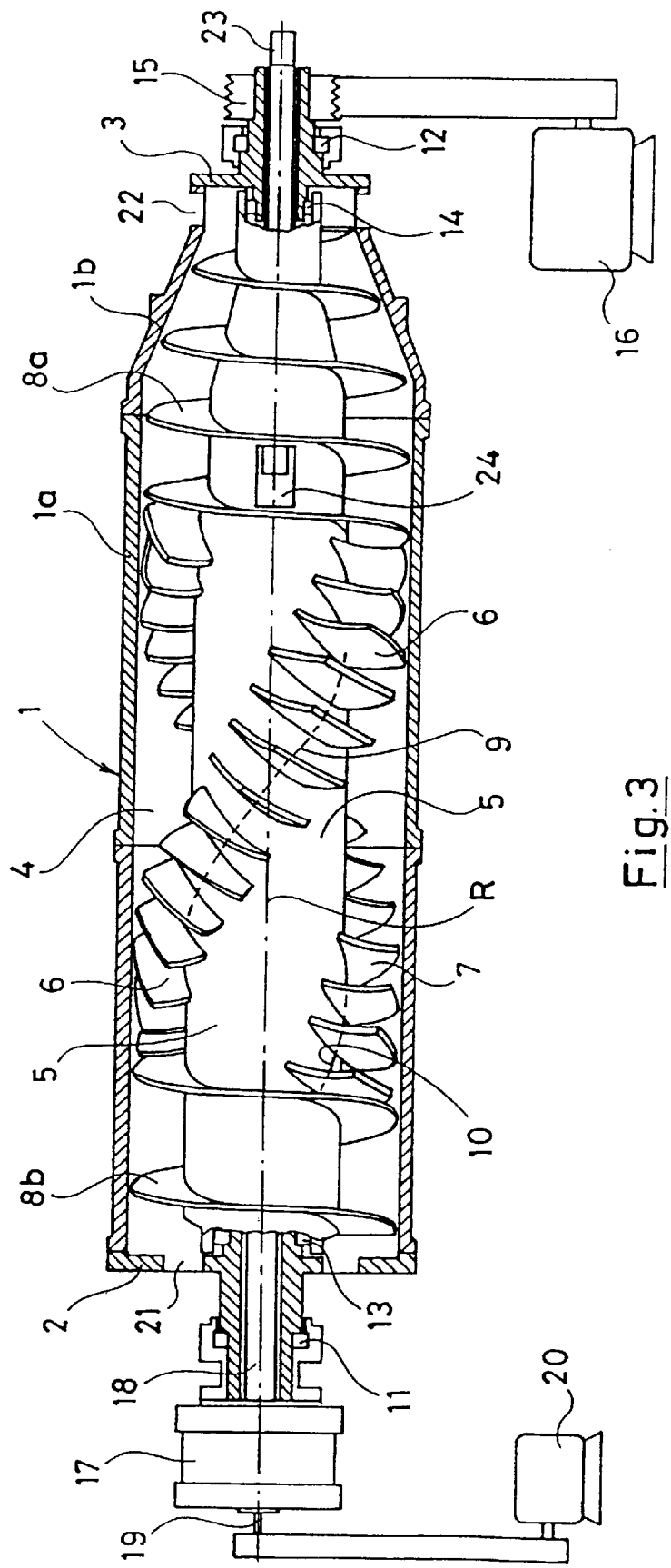
FIG. 3 shows a second embodiment of the invention.

The decanter centrifuge in FIG. 3 differs from the one in FIG. 1 only in two respects.

Firstly, the inner drum 5 supports on its end portion situated closest to the sludge outlet openings 22 a conventional sludge conveyor screw 8a, which is axially somewhat longer than the corresponding sludge conveyor screw 8 in FIG. 1. The sludge conveyor screw 8a thus extends axially along the whole of the conical part 1b of the outer drum and along part of the cylindrical drum part 1a. Hereby is achieved a more effective axial transportation of sludge in the conical drum part 1b, and there is also created better conditions for limiting in a manner previously known the axial transportation of sludge in this area of the drum 1 to a relatively narrow slot closest to the outer drum 1. Then the inner drum 5 supports in the area of the connection between the cylindrical drum part 1a and the conical drum part 1b a baffle (not shown), e.g. of a kind as described in U.S. Pat. Nos. 3,795,361 or 3,885,784.

Secondly, the inner drum 5 supports on its end portion situated closest to the liquid outlet openings 21, instead of blades, a conventional sludge conveyor screw 8b. Hereby, better conditions are created for getting the liquid flowing out through the outlet openings 21 substantially free of particles. Furthermore, it is achieved that a relatively thick layer of separated sludge can be maintained in the outer drum 1 rather close to the outlet openings 21 without risk of getting a large part of the particles entrained by the liquid flowing out through these openings 21.

Embodiments of the invention have been described above, in which the inner drum 5 supports two or three rows of blades. Within the frame of the invention there can of course be more than three rows of blades on the drum 5. It is also possible to arrange on the drum 5 only one row of blades extending helically. An embodiment of the invention of this kind can be considered to be schematically illustrated in FIG. 2, if the two rows of blades 25 and 27 are disregarded. Only the blades 26 will thus be left on the inner drum 5—possibly apart from conventional conveyor screws on the drum end portions, similar to the conveyor screws 8a and 8b in FIG. 3.

In an embodiment of the invention comprising only one row of blades 26 it is necessary for a satisfactory axial transportation of sludge in the outer drum 1 that two adjacent blades 26 (see FIG. 2)—one front and one rear blade seen in the axial direction 31 for transportation of sludge in the outer drum—are placed such that the rear edge 33 of the rear blade is situated axially in front of the front edge 32 of the front blade. Further, each of the blades 26 must have an extension along the drums 1 and 5 so limited that the distance in the circumferential direction of the drums, seen in a plane perpendicular to the rotational axis 28, between the rear edge 33 of a blade 26, which has displaced a sludge portion axially relative to the outer drum, and the front edge 32 of a blade 26 in front thereof, that should displace the same sludge portion further axially in the same direction, is substantially larger than the distance between the two adjacent blades 26, seen along the helical line on which the row of blades 26 is placed.

In the case the inner drum 5 supports only one row of blades 26, it may be suitable to have a row of counter weights placed on the drum diametrically in relation to the blades for reducing unbalance forces coming up.

What is claimed is:

1. A decanter centrifuge for freeing a liquid from particles suspended therein and having a density larger than that of the liquid and for compressing sludge containing particles separated from the liquid, comprising an outer drum (1), which has a center axis (R) and forms a separation chamber (4) surrounding the center axis, said separation chamber having an inlet (23, 24) for receiving said liquid that contains particles, an outlet (21) for discharging separated liquid from the separation chamber (4) at a predetermined radial level therein and an outlet (22) for sludge, an inner drum (5), which is arranged within the outer drum (1), means (15–20) for rotation of said drums (1, 5) at different speeds around said center axis (R) and blades (6, 7) which are carried by the inner drum (5) and are formed for transportation—in a predetermined axial direction (31)—of sludge, that is formed mainly by separated solid particles and that is situated in the separation chamber (4) radially outside said predetermined radial level, wherein said blades (6, 7) are placed in parallel blade rows, which are arranged at a distance from each other seen in the circumferential direction of the inner drum (5) and each of which extends in a certain pitch along a first helical line (9, 10) around at least part of said center axis (R), wherein each of the blades (6, 7) extends from a leading front edge (32) to a trailing rear edge (33) of the blade—with reference to the moving direction (30) of the inner drum (5) relative to the outer drum (1) during operation of the decanter centrifuge—substantially along part of a second helical line (29c), which extends around the center axis in a pitch opposite the pitch of the first helical line (9, 10), and further wherein the distance in the circumferential direction of the drums, seen in a plane substantially perpendicular to the said center axis (R), between the rear edge (33) of a first blade (26), which during operation of the decanter centrifuge has displaced a portion of sludge axially relative to the outer drum, and said front edge (32) of a second blade (27), that is arranged to displace this sludge portion further axially in the same direction, is substantially larger than the distance between two adjacent blades in the same row, seen along the first helical line (9, 19).

2. The decanter centrifuge according to claim 1, in which the inner drum (5) carries two parallel rows of blades (6,7).

3. The decanter centrifuge according to claim 1, in which the inner drum carries three parallel rows of blades (25–27).

4. The decanter centrifuge according to claim 1, in which the inner drum (5) is free of members between adjacent blades in the same row of blades, which could contribute to entrainment of said sludge portion in the movement of the inner drum in relation to the outer drum.

5. The decanter centrifuge according to claim 1, in which each blade (6,7,26) has a radially inner part, that is situated closest to the inner drum (5) and extends along an inner helical line around said center axis (R,28), and a radially outer part, that is situated closest to the outer drum (1) and extends along an outer helical line around the same center axis, said inner helical line having a larger pitch than said outer helical line.

6. The decanter centrifuge according to claim 1, in which the side surface of each blade, that is facing in the transportation direction (31) for the sludge, is concave so that the blade gets a function similar to that of a plough.

7. The decanter centrifuge according to claim 1, in which the inner drum (5) has a substantially imperforate surrounding wall carrying said blades (6,7).

8. The decanter centrifuge according to claim 1, in which the blades in each row of blades have substantially the same exension along their respective second helical line.

9. The decanter centrifuge according to claim 1, in which surfaces of the inner drum (5) between said parallel blade rows are free of members which during operation can influence said sludge portion.

10. A decanter centrifuge for freeing a liquid from particles suspended therein and having a density larger than that of the liquid and for compressing sludge containing particles separated from the liquid, comprising an outer drum (1), which has a center axis (28) and forms a separation chamber (4) surrounding the center axis, said separation chamber having a inlet (23, 24) for receiving said liquid that contains particles, an outlet (21) for discharging separated liquid from the separation chamber (4) at a predetermined radial level therein and an outlet (22) for sludge, an inner drum (5), which is arranged within the outer drum (1), means (15–20) for rotation of said drums (1, 5) at different speeds around said center axis (28) and blades (26), which are supported by the inner drum (5) and are formed for transportation—in a predetermined axial direction (31)—of sludge, which is formed mainly by separated solid particles and which in the separation chamber (4) is situated radially outside said predetermined radial level, wherein said blades (26) are placed in one single row of blades, that extends at a certain pitch along a first helical line around at least part of said center axis (28), wherein each of the blades (26) extends from a leading front edge (32) to a trailing rear edge (33) of the blade—with respect to the movement direction (30) of the inner drum relative to the outer drum during operation of the decanter centrifuge—substantially along part of a second helical line (29c) extending around the center axis in a pitch opposite the pitch of the first helical line, wherein two adjacent blades (26)—a front blade and rear blade, seen in said predetermined axial direction (31) for the transportation of solid particles—are placed such that the rear edge (33) of the rear blade is situated axially in front of the front edge (32) of the front blade, and further wherein the distance in the circumferential direction of the drums, seen in a plane substantially perpendicular to said center axis (28), between said rear edge (33) of the rear blade (26), which during operation of the decanter centrifuge has axially displaced a portion of sludge relative to the outer drum, and said front edge (32) of the front blade (26), which is arranged to displace this sludge portion further axially in the same direction, is substantially larger than the distance between the two adjacent blades (26), seen along said first helical line.

11. The decanter centrifuge according to claim 10, in which the inner drum (5) is free of members between adjacent blades in the single row of blades, which could contribute to entrainment of said sludge portion in the movement of the inner drum in relation to the outer drum.

12. The decanter centrifuge according to claim 10, in which each blade has a radially inner part, that is situated closest to the inner drum (5) and extends along an inner helical line around said center axis (R, 28), and a radially outer part, that is situated closest to the outer drum (1) and extends along an outer helical line around the same center axis, said inner helical line having a larger pitch than said outer helical line.

13. The decanter centrifuge according to claim 10, in which the side surface of each blade, that is facing in the transportation direction (31) for the sludge, is concave so that the blade gets a function similar to that of a plough.

14. The decanter centrifuge according to claim 10, in which the inner drum (5) has a substantially imperforate surrounding wall carrying said blades.

15. The decanter centrifuge according to claim 10, in which the blades in the single row of blades have substantially the same extension along their respective second helical line.

* * * * *